(12) United States Patent
Wilms et al.

(10) Patent No.: US 8,181,307 B2
(45) Date of Patent: May 22, 2012

(54) WIPER BLADE

(75) Inventors: Christian Wilms, Koersel-Beringen (BE); Koen Lammens, Haverlee (BE); Hubert Verelst, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 12/447,956

(22) PCT Filed: Dec. 3, 2007

(86) PCT No.: PCT/EP2007/063117
§ 371 (c)(1),
(2), (4) Date: Apr. 30, 2009

(87) PCT Pub. No.: WO2008/080720
PCT Pub. Date: Jul. 10, 2008

(65) Prior Publication Data
US 2010/0071148 A1    Mar. 25, 2010

(30) Foreign Application Priority Data
Dec. 28, 2006 (DE) .......................... 10 2006 061 680

(51) Int. Cl.
*B60S 1/38* (2006.01)
(52) U.S. Cl. ................. 15/250.43; 15/250.452
(58) Field of Classification Search .............. 15/250.44, 15/250.43, 250.451–250.454, 250.361, 250.201
See application file for complete search history.

(56) References Cited

U.S. PATENT DOCUMENTS

| 2006/0107485 A1* | 5/2006 | Kim .................. 15/250.201 |
| 2007/0289082 A1 | 12/2007 | Herinckx et al. |
| 2008/0016643 A1 | 1/2008 | Braun et al. |

FOREIGN PATENT DOCUMENTS

WO  WO2005/115813  * 12/2005

OTHER PUBLICATIONS

PCT/EP2007/063117 International Search Report.

* cited by examiner

*Primary Examiner* — Gary Graham
(74) *Attorney, Agent, or Firm* — Michael Best & Friedrich LLP

(57) ABSTRACT

The invention is based on a wiper blade (10) having a wiper strip (32) and a support element (30) at whose ends endcaps (12) are guided, said endcaps (12) at their end sides (28) facing the ends of the wiper blade (10) extending as far as a wiper lip (34) via the support element (30), wherein at least one endcap (12) has a lid (14) which is connected to the endcap (12) so as to be capable of pivoting about an articulation axis (18) transversely with respect to the wiper blade (10) and has a gudgeon (22) on its side facing the head strip (38), which gudgeon (22) penetrates the head strip (38) when the lid (14) is closed. It is proposed that the tip of the gudgeon (22) be secured by parts of the endcap (12) or of the lid (14) against contact both in the opened state of the lid (14) and in the closed state.

18 Claims, 2 Drawing Sheets

WIPER BLADE

BACKGROUND OF THE INVENTION

The invention is based on a wiper blade.

DE 10 2004 051 467 A1 discloses a wiper blade. Two spring rails serving as a support element are guided in inner guide profiles of the end caps which are closed on the end side facing the end of the wiper blade such that the spring rails are fixed in the longitudinal direction relative to the end caps by the closed end surfaces. The end caps, for their part, are fixed in the longitudinal direction with respect to the head strip of the wiper strip by means of releasable retaining means. The spring rails are therefore also fixed relative to the wiper strip by the end caps. In one exemplary embodiment, the retaining means used between the end cap and the head strip is a needle or a gudgeon which is integrally formed on that side of a lid which faces a wiper strip and, during the installation, penetrates the head strip of the wiper strip as soon as the lid is closed. In the closed position, the lid latches to the end cap. For easier actuation of the lid, the outside of the latter can have gripping grooves. Wiper blades which, as a support element, have a spring rail which is accommodated in a longitudinal channel of the wiper strip, are also known.

SUMMARY OF THE INVENTION

According to the invention, the tip of the gudgeon is protected by parts of the end cap or of the lid against contact both in the open state of the lid and in closed state. For this purpose, skirts running in the longitudinal direction of the wiper blade are expediently integrally formed on the end cap in the region of the gudgeon, said skirts laterally overlapping the gudgeon and running parallel to the head strip when the lid is closed. The skirts prevent a person from unintentionally coming into contact with the tip of the gudgeon and being injured. Without the skirts, there is the risk of injury in particular when a wiper strip has not yet been fitted and the lid is closed, if a finger unintentionally strays into the region of the gudgeon. In order to be able to change the wiper strip and, if appropriate, the support element, which may comprise one spring rail or a plurality of spring rails, it generally suffices if just one end cap per wiper blade is designed in the manner according to the invention. The wiper strip and the support element can then be removed in the longitudinal direction of the wiper blade after said end cap is taken away.

So that the skirts do not need to be too long, it is expedient for the distance between the skirts to be chosen to be as small as possible, such that they run with little clearance with respect to the head strip. In this case, they are advantageously arranged on the lower sides of guides in which the spring rails serving as the support element are guided. Since the skirts run tightly against the head strip, contact between them and a vehicle window during the wiping is avoided. Despite a relatively small extent in the direction of the gudgeon, good protection against injuries is achieved because of the small intermediate space between the skirts. It thus advantageously suffices for the skirts to extend into the region of lateral support strips of the wiper strip.

In order also to rule out injuries when the lid is open, it is expedient for the lid not to be connected releaseably to the end cap and for the gudgeon to be fitted in a cutout on the inner side of a top wall of the lid. It is also favorable for the pivoting angle of the lid to be restricted in such a manner that, in the open position of the lid, the tip of the gudgeon is covered by parts of the end cap.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
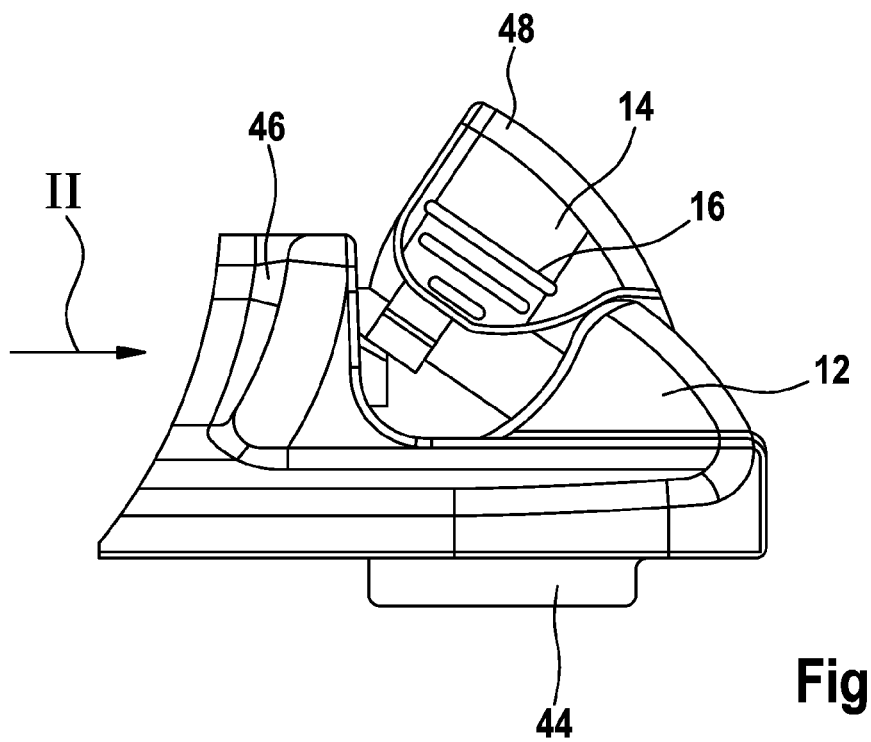
FIG. 1 shows a side view of an end cap with an open flap.
Figure 2:
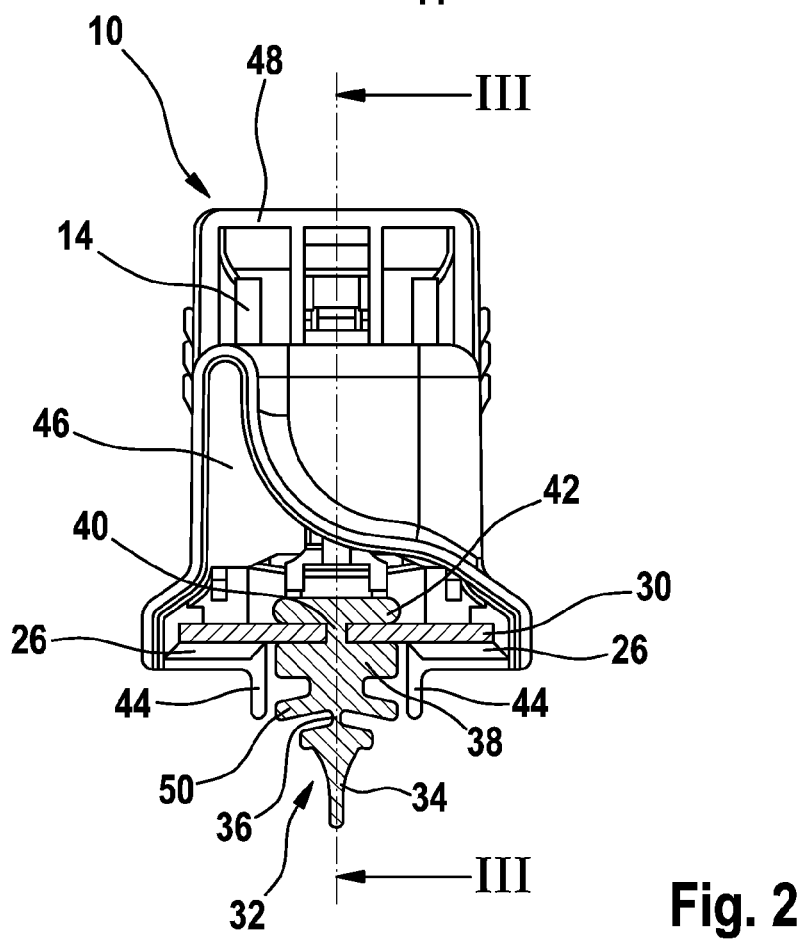
FIG. 2 shows a cross section through a wiper blade according to the invention, as seen in the direction of an arrow II in FIG. 1.
Figure 3:
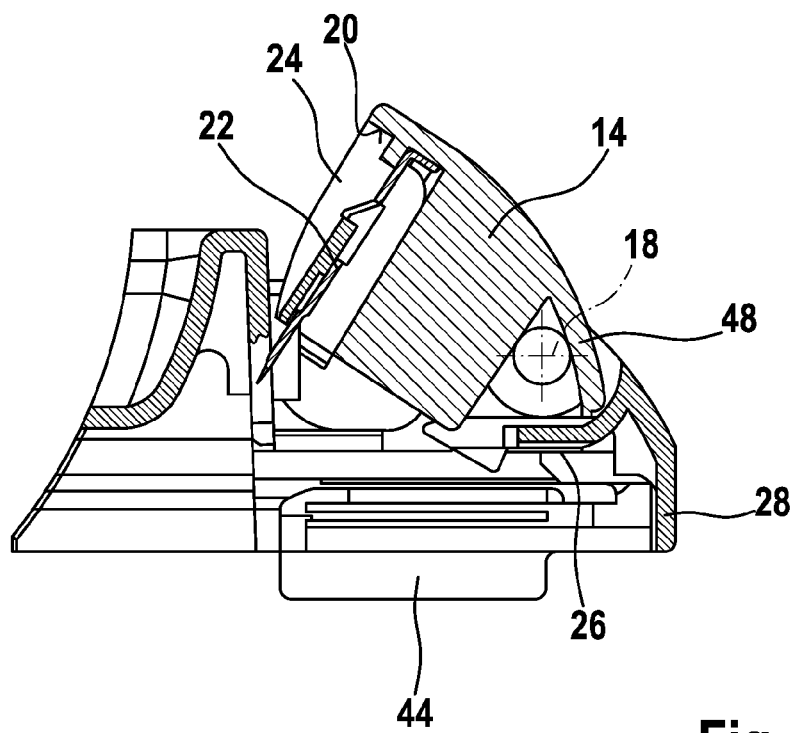
FIG. 3 shows a section corresponding to the line III III in FIG. 2, but without a wiper strip and spring rails.
Figure 4:
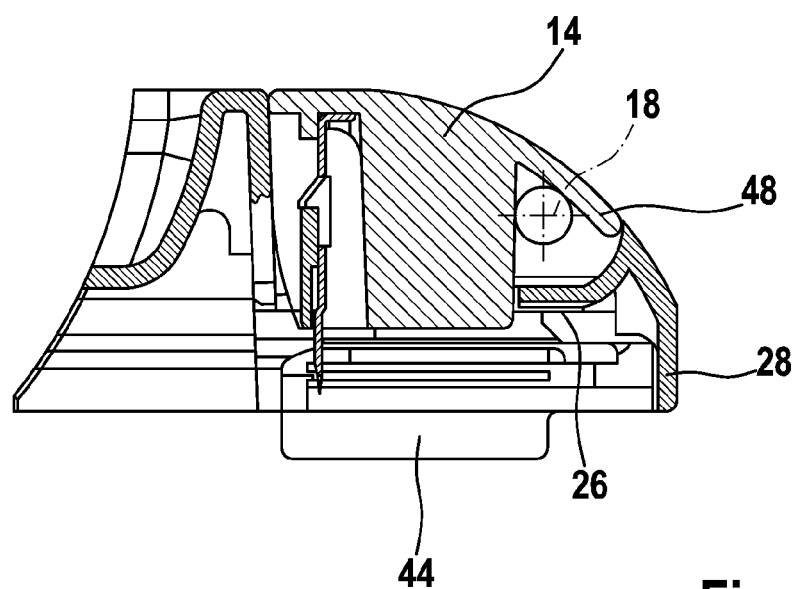
FIG. 4 shows a section corresponding to FIG. 3, but with a closed flap.

A wiper blade 10 has a wiper strip 32, the wiper lip 34 of which is connected to a head strip 38 via a tilting web 36. Lateral support strips 50, on which the wiper lip 34 can be supported when it turns over in the end positions of the wiping movement, are located between the head strip 38 and the tilting web 36.

Longitudinal grooves which form a web 40 between them are provided on the longitudinal sides of the head strip 38. Said web connects a back strip 42 to the remaining part of the head strip 38. Spring rails 30 are inserted, as a support element, into the lateral longitudinal grooves and protrude for a distance laterally out of the longitudinal grooves. A connecting element (not illustrated) for the articulated connection to a wiper arm, a spoiler and end caps 12 can be fitted on the protruding parts of the spring rails 30. The end caps 12 have connecting profiles 46 for a spoiler.

The end caps 12 sit with guides 26 on the spring rails 30 and hold the latter together. Since those end sides 28 of the end caps 12 which face the ends of the wiper blade 10 are closed and extend over the region of the spring rails 30, the end caps 12 fix the spring rails 30 in the longitudinal direction of the wiper blade 10 if they are themselves fixed in the longitudinal direction. For this purpose, use is made of retaining means in the form of a gudgeon 22 which is arranged in a cutout 24 of a lid 14 on an inner side 20 of a top wall 48. The lid 14 is connected to the end cap so as to be capable of pivoting about an articulation axis 18 running transversely with respect to the longitudinal direction of the wiper blade 10, with the outer contour of said lid 14, in the closed state thereof, harmoniously adjoining the outer contour of the end cap 12. For easier actuation of the lid, gripping strips 16 are provided on the outside thereof.

If the lid 14 is closed during the installation of the end cap 12, the tip of the gudgeon 22 penetrates the back strip 42 of the head strip 38 and fixes the end cap 12 in relation to the wiper strip 32 such that the spring rails 30 are now also secured in the longitudinal direction of the wiper blade 10 between the end caps 12. To change the wiper strip 32, it suffices if just one end cap 12 has a lid 14 with a gudgeon 22. The other end cap 12 can be fixed as desired in the longitudinal direction, for example can be connected integrally to a spoiler part.

To protect against injuries, the end cap 12 has skirts 44 in the region of the gudgeon 22 when the lid 14 is closed, said skirts extending parallel to the wiper strip 32 and into the region of the lateral support strips 50. The skirts 44 are expediently integrally formed on the lower sides of the guides 26 and run with little clearance with respect to the head strip 38. The effect achieved by this is that it is scarcely possible to come into contact with the tip of the gudgeon 22 through the narrow intermediate space, even if the wiper strip 32 has not yet been fitted. It is furthermore avoided that the skirts 44 come into contact with a vehicle window during a wiping movement of the wiper blade 10 thereover.

The invention claimed is:

1. An elongated wiper blade (10) defining a longitudinal axis with a wiper strip (32) and a support element (30), at the ends of which end caps (12) are guided, said end caps, at their end sides (28) facing the ends of the wiper blade (10), extending over the support element (30) as far as a wiper lip (34), wherein at least one end cap (12) has a lid (14) which is connected to the end cap (12) for pivoting movement about an articulation axis (18) extending transversely with respect to the wiper blade (10) and has a gudgeon (22) on its side facing a head strip (38) of the wiper blade, which gudgeon penetrates the head strip (38) when the lid (14) is in a closed state, characterized in that a tip of the gudgeon (22) is protected by parts of at least one of the end cap (12) and the lid (14) against contact both in an opened state of the lid (14) and in the closed state, the end cap having an internal wall defining a surface extending generally perpendicular to the longitudinal axis, an opening being defined through the wall, at least the tip of the gudgeon extending through the surface to within the opening in the opened state, the end cap having skirts (44), in the closed state, the skirts laterally overlapping the gudgeon.

2. The wiper blade (10) as claimed in claim 1, characterized in that the skirts (44) run in the longitudinal direction and are integrally formed on the end cap (12) in a region of the gudgeon (22), said skirts running parallel to the head strip (38) when the wiper strip (32) is fitted.

3. The wiper blade (10) as claimed in claim 2, characterized in that the skirts (44) are arranged on lower sides of guides (26), in which the support element (30) is guided, and run with little clearance with respect to the head strip (38).

4. The wiper blade (10) as claimed in claim 3, characterized in that the skirts (44) extend into a region of lateral support strips (50) of the wiper strip (32).

5. The wiper blade (10) as claimed in claim 4, characterized in that the gudgeon (22) is fitted in a cutout (24) on an inner side (20) of a top wall (48) of the lid (14).

6. The wiper blade (10) as claimed in claim 5, characterized in that a pivoting angle of the lid (14) is restricted in such a manner that, in the opened state of the lid (14), the tip of the gudgeon (22) is covered by parts of the end cap (12).

7. The wiper blade (10) as claimed in claim 1, characterized in that the skirts (44) extend into a region of lateral support strips (50) of the wiper strip (32).

8. The wiper blade (10) as claimed in claim 1, characterized in that the gudgeon (22) is fitted in a cutout (24) on an inner side (20) of a top wall (48) of the lid (14).

9. The wiper blade (10) as claimed in claim 1, characterized in that a pivoting angle of the lid (14) is restricted in such a manner that, in the opened state of the lid (14), the tip of the gudgeon (22) is covered by parts of the end cap (12).

10. An end cap (12) for use with an elongated wiper blade (10) defining a longitudinal axis with a wiper strip (32) and a support element (30), at an end of which the end cap (12) is guided, when supported on the support element (30), said end cap, at its end side (28) facing the end of the wiper blade (10), extending over the support element (30) as far as a wiper lip (34), and having a lower wall extending generally parallel to the longitudinal axis, said end cap having a lid (14) which is connected to the end cap (12) so as to be capable of pivoting about an articulation axis (18) transversely with respect to the wiper blade (10) and has a gudgeon (22) on its side facing a head strip (38) of the wiper blade, which gudgeon penetrates the head strip (38) when the lid (14) is in a closed state, characterized in that a tip of the gudgeon (22) is protected by parts of at least one of the end cap (12) and the lid (14) against contact both in an opened state of the lid (14) and in the closed state, the end cap having an internal wall defining a surface extending generally perpendicular to the lower wall, an opening being defined through the wall, at least the tip of the gudgeon extending through the surface to within the opening in the opened state, the end cap having skirts (44), in the closed state, the skirts laterally overlapping the gudgeon.

11. An end cap (12) as claimed in claim 10, characterized in that the skirts (44) run in a longitudinal direction and are integrally formed on the end cap (12) in a region of the gudgeon (22), said skirts running parallel to the head strip (38) when the wiper strip (32) is fitted.

12. An end cap (12) as claimed in claim 11, characterized in that the skirts (44) are arranged on lower sides of guides (26), in which the support element (30) is guided, and run with little clearance with respect to the head strip (38).

13. An end cap (12) as claimed in claim 12, characterized in that the skirts (44) extend into a region of lateral support strips (50) of the wiper strip (32).

14. An end cap (12) as claimed in claim 13, characterized in that the gudgeon (22) is fitted in a cutout (24) on an inner side (20) of a top wall (48) of the lid (14).

15. An end cap (12) as claimed in claim 14, characterized in that a pivoting angle of the lid (14) is restricted in such a manner that, in the opened state of the lid (14), the tip of the gudgeon (22) is covered by parts of the end cap (12).

16. An end cap (12) as claimed in claim 10, characterized in that the skirts (44) extend into a region of lateral support strips (50) of the wiper strip (32).

17. An end cap (12) as claimed in claim 10, characterized in that the gudgeon (22) is fitted in a cutout (24) on an inner side (20) of a top wall (48) of the lid (14).

18. An end cap (12) as claimed in claim 10, characterized in that a pivoting angle of the lid (14) is restricted in such a manner that, in the opened state of the lid (14), the tip of the gudgeon (22) is covered by parts of the end cap (12).

\* \* \* \* \*